(12) United States Patent
Duan et al.

(10) Patent No.: US 7,742,493 B2
(45) Date of Patent: Jun. 22, 2010

(54) SYNCHRONOUS TRANSPORT SIGNAL MAPPER WITH PAYLOAD EXTRACTION AND INSERTION FUNCTIONALITY

(75) Inventors: Cheng Gang Duan, Shanghai (CN); Lin Hua, Shanghai (CN); Michael S. Shaffer, Lynnfield, MA (US)

(73) Assignee: Agere Systems Inc., Allentown, PA (US)

( * ) Notice: Subject to any disclaimer, the term of this patent is extended or adjusted under 35 U.S.C. 154(b) by 306 days.

(21) Appl. No.: 11/839,971

(22) Filed: Aug. 16, 2007

(65) Prior Publication Data
US 2009/0046741 A1 Feb. 19, 2009

(51) Int. Cl.
*H04L 12/28* (2006.01)
(52) U.S. Cl. ........................ 370/419; 370/366
(58) Field of Classification Search ............ 370/419
See application file for complete search history.

(56) References Cited

U.S. PATENT DOCUMENTS

| | | | |
|---|---|---|---|
| 2001/0012288 A1* | 8/2001 | Yu .............................. | 370/352 |
| 2007/0047579 A1* | 3/2007 | Mukhopadhyay et al. ... | 370/469 |
| 2008/0130679 A1* | 6/2008 | Natarajan et al. .......... | 370/465 |

OTHER PUBLICATIONS

Agere Systems, "TMXF84622 Ultramapper 622/155 Mbits/s SONET/SDH x DS3/E3/DS2/DS1/E1/DS0," Ultramapper Resource Document, Jun. 6, 2002, pp. 1-250.
Agere Systems, "NSMI Enhancements for V3 Mapper Devices," Application Note, Revision 1, Jan. 11, 2005, pp. 1-11.

* cited by examiner

*Primary Examiner*—Pankaj Kumar
*Assistant Examiner*—Gautam Sharma
(74) *Attorney, Agent, or Firm*—Ryan, Mason & Lewis, LLP

(57) ABSTRACT

In a communication system comprising a mapper or other type of physical layer device coupled to a link layer device, the physical layer device comprises payload extraction circuitry and payload insertion circuitry. The payload extraction circuitry is configured to extract a payload from an ingress synchronous transport signal received over an ingress link, and the payload insertion circuitry is configured to insert a payload received from the link layer device into an egress synchronous transport signal for transmission over an egress link. The payload extracted from the ingress synchronous transport signal is transmitted by the physical layer device to the link layer device over an output serial data line of a serial interface, and the payload inserted into the egress synchronous transport signal is received by the physical layer device from the link layer device over an input serial data line of the serial interface.

20 Claims, 5 Drawing Sheets

SYNCHRONOUS TRANSPORT SIGNAL MAPPER WITH PAYLOAD EXTRACTION AND INSERTION FUNCTIONALITY

FIELD OF THE INVENTION

The present invention relates generally to network-based communication systems, and more particularly to mappers or other physical layer devices which process synchronous transport signals in such communication systems.

BACKGROUND OF THE INVENTION

Conventional network-based communication systems include systems configured to operate in accordance with well-known synchronous transport standards, such as the synchronous optical network (SONET) and synchronous digital hierarchy (SDH) standards.

The SONET standard was developed by the Exchange Carriers Standards Association (ECSA) for the American National Standards Institute (ANSI), and is described in the document ANSI T1.105-1988, entitled "American National Standard for Telecommunications—Digital Hierarchy Optical Interface Rates and Formats Specification" (September 1988), which is incorporated by reference herein. SDH is a corresponding standard developed by the International Telecommunication Union (ITU), set forth in ITU standards documents G.707 and G.708, which are incorporated by reference herein.

The basic unit of transmission in the SONET standard is referred to as a synchronous transport signal level-1 (STS-1). It has a serial transmission rate of 51.84 Megabits per second (Mbps).

Synchronous transport signals at higher levels may be concatenated or channelized. For example, an intermediate unit of transmission in the SONET standard is referred to as synchronous transport signal level-3, concatenated (STS-3c). It has a serial transmission rate of 155.52 Mbps. The corresponding unit in the SDH standard is referred to as STM-1. In a concatenated synchronous transport signal, the entire payload is available as a single channel. A channelized signal, by way of contrast, is divided into multiple channels each having a fixed rate. For example, the channelized counterpart to the concatenated STS-3c signal is denoted STS-3. STS-3 is a channelized signal that comprises three separate STS-1 signals each at 51.84 Mbps.

A given STS-3c or STM-1 signal is organized in frames having a duration of 125 microseconds, each of which may be viewed as comprising nine rows by 270 columns of bytes, for a total frame capacity of 2,430 bytes per frame. The first nine bytes of each row are overhead, while the remaining 261 bytes of each row are payload. The overhead includes transport overhead (TOH) and path overhead (POH). Additional details regarding signal and frame formats, such as J0, J1 and other signals, and synchronous payload envelope (SPE) formats, can be found in the above-cited documents.

A drawback of conventional SONET or SDH network-based communication systems relates to the mapping of synchronous transport signals like STS-3c or STM-1 to or from corresponding higher-rate optical signals such as a SONET OC-12 signal or an SDH STM-4 signal. An OC-12 optical signal carries four STS-3c signals, and thus has a rate of 622.08 Mbps. The SDH counterpart to the OC-12 signal is the STM-4 signal, which carries four STM-1 signals, and thus also has a rate of 622.08 Mbps. The mapping of these and other synchronous transport signals to or from higher-rate optical signals generally occurs in a physical layer device commonly referred to as a mapper, which may be used implementing implement an add-drop multiplexer (ADM) or other node of a SONET or SDH communication system.

Such a mapper typically interacts with a link layer processor. A link layer processor is one example of what is more generally referred to herein as a link layer device, where the term "link layer" generally denotes a switching function layer. Another example of a link layer device is a field programmable gate array (FPGA). These and other link layer devices can be used to implement processing associated with various packet-based protocols, such as Internet Protocol (IP) and Asynchronous Transfer Mode (ATM), as well as other protocols, such as Fiber Distributed Data Interface (FDDI).

In mapping synchronous transport signals like STS-3c or STM-1 to or from higher-rate optical signals, a typical conventional mapper is unable to extract and transfer just the payload of the STS-3c or STM-1 signal to the link layer device. This is disadvantageous in that it requires the link layer device to include circuitry for performing the payload extraction operation, which increases the complexity and cost of the link layer device. Also, the link layer device is usually not optimized for such operations, and thus throughput performance may be negatively impacted. Similarly, the typical conventional mapper is unable to receive just the payload of the STS-3c or STM-1 signal from the link layer device, but instead must receive the entire signal including all framing overhead information. Again, this results in additional hardware requirements in the link layer device, in that circuitry is required to add the framing overhead to the payload to form the complete STS-3c or STM-1 signal. Implementing this type of payload insertion operation in the link layer device may also have a negative impact on throughput performance.

Accordingly, a need exists for an improved mapper that is capable of processing synchronous transport signals such as STS-3c or STM-1 without requiring that payload extraction or insertion operations for such signals be performed by a link layer device.

SUMMARY OF THE INVENTION

Illustrative embodiments of the present invention overcome the above-noted drawbacks of conventional practice by providing mappers that are configured to perform payload extraction and insertion operations on STS-3c or STM-1 signals, as well as other types of synchronous transport signals, such as STS-3.

In accordance with an aspect of the invention, a mapper or other type of physical layer device is configured for communication with a link layer device in a network-based communication system. The physical layer device comprises payload extraction circuitry and payload insertion circuitry. The payload extraction circuitry is configured to extract a payload from an ingress synchronous transport signal received over an ingress link, and the payload insertion circuitry is configured to insert a payload received from the link layer device into an egress synchronous transport signal for transmission over an egress link. The payload extracted from the ingress synchronous transport signal is transmitted by the physical layer device to the link layer device over an output serial data line of a serial interface, and the payload inserted into the egress synchronous transport signal is received by the physical layer device from the link layer device over an input serial data line of the serial interface.

In a given one of the illustrative embodiments, the serial interface between the physical layer device and the link layer device comprises a network serial multiplexed interface. This serial interface includes, in addition to the above-noted input and output serial data lines, input and output gapped clock signal lines, input and output byte mark signal lines, and separate output extraction and insertion synchronization signal lines for carrying respective extraction and insertion synchronization signals for use by the link layer device in processing information associated with the respective extracted and inserted payloads. The physical layer device may be configured to provide a programmable delay between a given pulse of the insertion synchronization signal and a designated bit of the inserted payload. As a more particular example, the designated bit may comprise a most significant bit of a given byte of the inserted payload.

The illustrative embodiments of the invention as described herein provide a number of significant advantages over the conventional techniques previously described. For example, by configuring a mapper to perform payload extraction and insertion operations for STS-3c or STM-1 signals, or other types of synchronous transport signals, the complexity and cost of the link layer device are significantly reduced, and throughput performance is improved.

DETAILED DESCRIPTION OF THE INVENTION

The invention will be illustrated herein in conjunction with an exemplary network-based communication system which includes a physical layer device, a link layer device and other elements configured in a particular manner. It should be understood, however, that the invention is more generally applicable to any system in which it is desirable to provide enhanced efficiency and flexibility in processing synchronous transport signals.

A "link layer device" as the term is used herein refers generally to a link layer processor or other type of processor which performs processing operations associated with a link layer of a network-based system. Such a device may be implemented, by way of example and without limitation, utilizing a microprocessor, central processing unit (CPU), digital signal processor (DSP), application-specific integrated circuit (ASIC), or other type of data processing device, as well as portions or combinations of these and other devices. As mentioned previously, another example of a link layer device is an FPGA.

A "physical layer device" as the term is used herein refers generally to a device which provides an interface between a link layer device and a physical transmission medium of a network-based system.

Figure 1:
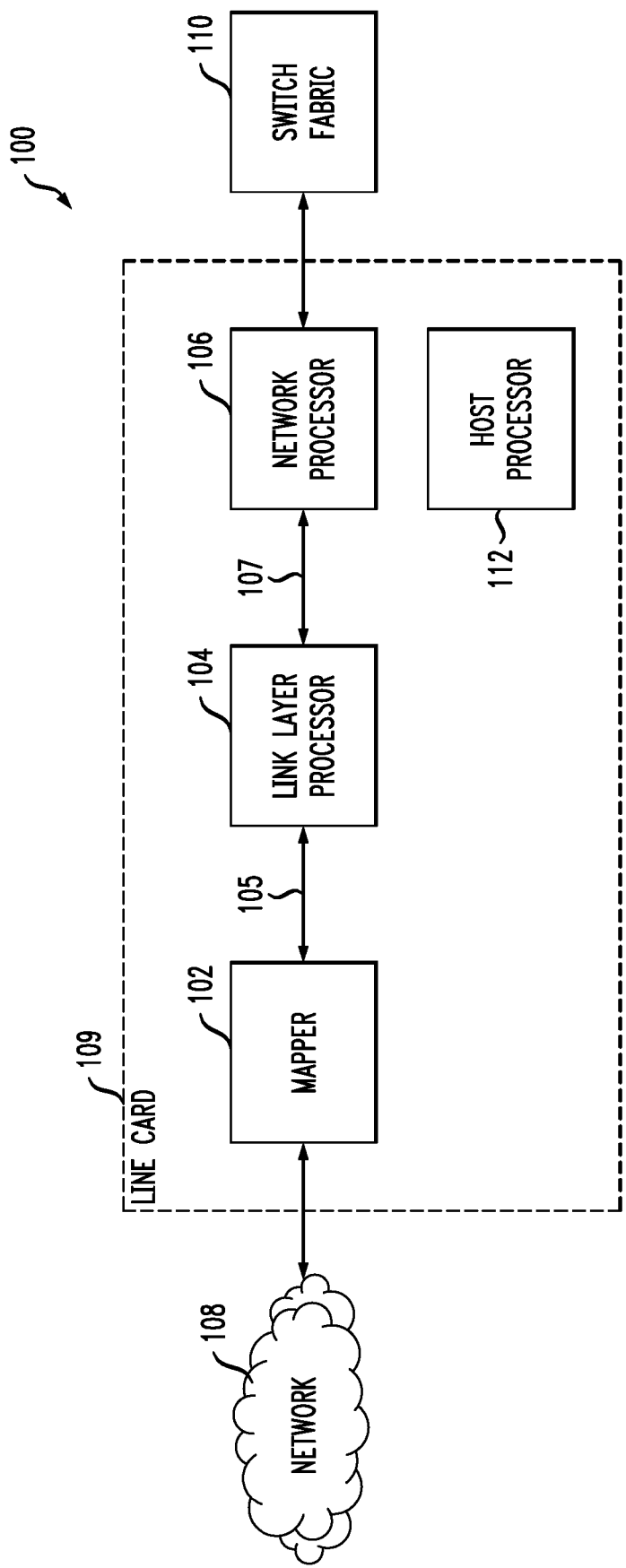
FIG. 1 is a block diagram of one possible implementation of a network-based communication system in accordance with an illustrative embodiment of the invention.

FIG. 1 shows a network-based communication system 100 in which the invention is implemented. The system 100 includes a mapper 102 coupled to a link layer processor 104 via an interface 105. The mapper 102 is a physical layer device suitable for providing access termination and aggregation for multiple services. One or more additional physical layer devices may be utilized in conjunction with the mapper 102, but such devices are not explicitly shown in the figure for clarity and simplicity of illustration. The link layer processor 104 is also coupled to a network processor 106, via an interface 107. The mapper 102 in this embodiment is coupled to a network 108. Examples of other types of physical layer devices that may be incorporated into the system 100 include an optical transceiver for interfacing the mapper with an optical transmission medium of the network 108.

The illustrative embodiment configures the mapper 102 and link layer processor 104 such that payload extraction and insertion operations for STS-3c and STM-1 signals can be performed in the mapper, with just the STS-3c or STM-1 payload being communicated between the mapper and the link layer processor. It should be noted that STS-3c or STM-1 signals in the illustrative embodiments may alternatively be STS-3 signals, or other types of concatenated or channelized synchronous transport signals.

The mapper 102 and link layer processor 104 may include additional functionality of a conventional type. Such additional functionality, being well known to those skilled in the art, will not be described in detail herein, but may include functionality associated with known mappers, such as the LSI Hypermapper™, Ultramapper™ and Supermapper™ devices, and known link layer devices, such as the LSI Link Layer Processor. These LSI devices are commercially available from LSI Corporation of Allentown, Pa., U.S.A. The network processor 106 may comprise, for example, a conventional network processor such as an LSI Advanced PayloadPlus® network processor in the APP300, APP500 or APP650 product family, also commercially available from LSI Corporation.

Additional details regarding conventional aspects of a SONET/SDH mapper can be found in, for example, TMXF84622 Ultramapper™ 622/155 Mbits/s SONET/SDH x DS3/E3/DS2/DS1/E1/DS0, Ultramapper™ Resource Document, Jun. 6, 2002, which is incorporated by reference herein.

The mapper 102, link layer processor 104, and network processor 106 in this illustrative embodiment are installed on a line card 109 of the system 100. The line card 109 is coupled between network 108 and a switch fabric 110 of the system 100 as shown. The link layer processor 104 and network processor 106 are configured to communicate packets, cells or other protocol data units (PDUs) between the network 108 and the switch fabric 110 which controls switching of PDU data. As indicated previously, the mapper 102 serves to interface the link layer processor 104 to physical transmission media of the network 108, which may comprise optical fiber links or any other type of transmission media.

Also installed on the line card is a host processor 112. This processor is used to configure and control one or more of the other processing elements of the line card 109, such as the mapper 102, link layer processor 104 and network processor 106. As a more particular example, a given such host processor utilized to configure and control both the mapper 102 and the link layer processor 104 is referred to herein as a microprocessor unit (MPU). A clock signal associated with the MPU is referred to as MPUCLK in conjunction with FIGS. 5 and 6. Portions of the host processor functionality may be incorporated into one or more of elements 102, 104 or 106 in alternative embodiments of the invention.

It should be noted that the line card configuration shown in FIG. 1 is merely one example of a possible system configuration. Other embodiments can be implemented using a wide variety of other types of structural arrangements that do not involve line cards. The elements 102, 104, 106, 109, 110 and 112 in this example may be viewed as being part of a particular node of network 108 that operates in accordance with the SONET or SDH standards. Other nodes of the network 108 may of course be configured in a similar manner.

In this illustrative embodiment, the interface 105 between the mapper 102 and the link layer processor 104 comprises a serial interface over which STS-3c or STM-1 payloads extracted by the mapper are transmitted to the link layer processor, and over which STS-3c or STM-1 payloads for insertion by the mapper are received from the link layer processor. The operation of interface 105 will be described in greater detail below in conjunction with FIGS. 2 through 6.

The interface 107 between the link layer processor 104 and the network processor 106 may be, for example, a conventional interface such as a SPI-3 interface as described in Implementation Agreement OIF-SPI3-01.0, "System Packet Interface Level 3 (SPI-3): OC-48 System Interface for Physical and Link Layer Devices," Optical Internetworking Forum, 2001, which is incorporated by reference herein. Other types of known interfaces, such as POS-2, may also be used.

Although the link layer processor 104 and network processor 106 are shown as separate elements in this illustrative embodiment, other embodiments may combine the functionality of the link layer processor and the network processor into a single link layer device. The general term "link layer device" as used herein is thus intended to encompass devices which incorporate at least a portion of the functionality commonly associated with a network processor.

For example, a given link layer device may be configured to provide flow control, traffic shaping and other functions. It may include an internal memory, as well as an interface to an external memory. Such memory elements may be utilized for implementing PDU buffer memory, queuing and dispatch buffer memory, etc. The link layer device may further include one or more memory controllers, as well as appropriate interface circuitry for interfacing with the mapper 102 or other physical layer device(s), the switch fabric 110, and other external devices, such as the host processor 112, which may be configured to communicate with the link layer device over a standard bus architecture, e.g., a peripheral component interconnect (PCI) bus. The link layer device may also include a scheduler, queuing and dispatch logic, as well as other conventional elements not explicitly shown in the figure. The operation of these and other conventional elements, being well understood by those skilled in the art, is not described in detail herein.

Numerous alternative interfacing arrangements are possible. It is also possible that, in other embodiments, a given link layer device may be combined with one or more physical layer devices into a single device. Thus the mapper 102 and any associated physical layer device(s) need not be physically separate from the link layer processor 104 as in the FIG. 1 embodiment, but such elements could instead be combined into a single integrated circuit or other type of processing device.

In describing the illustrative embodiment, it will be assumed that the term "ingress" refers to a direction of data transfer from the network 108 to the switch fabric 110. Similarly, it will be assumed that the term "egress" refers to a direction of data transfer from the switch fabric 110 to the network 108. It should be understood that these and other assumptions made herein are for clarity and simplicity of description only, and should not be construed as limitations of the invention. The terms "ingress" and "egress" as used herein thus do not refer to particular fixed directions, but instead may be viewed as arbitrary input and output data flow directions in a particular system implementation.

It should also be noted that the particular arrangement of system elements shown in FIG. 1 is by way of illustrative example only. More particularly, the invention can be implemented in any type of communication system having at least one physical layer device and at least one link layer device, and is not limited to the particular signal processing applications described herein. The system 100 may include other elements in addition to or in place of those specifically shown, including one or more elements of a type commonly found in a conventional implementation of such a system.

Figure 2:
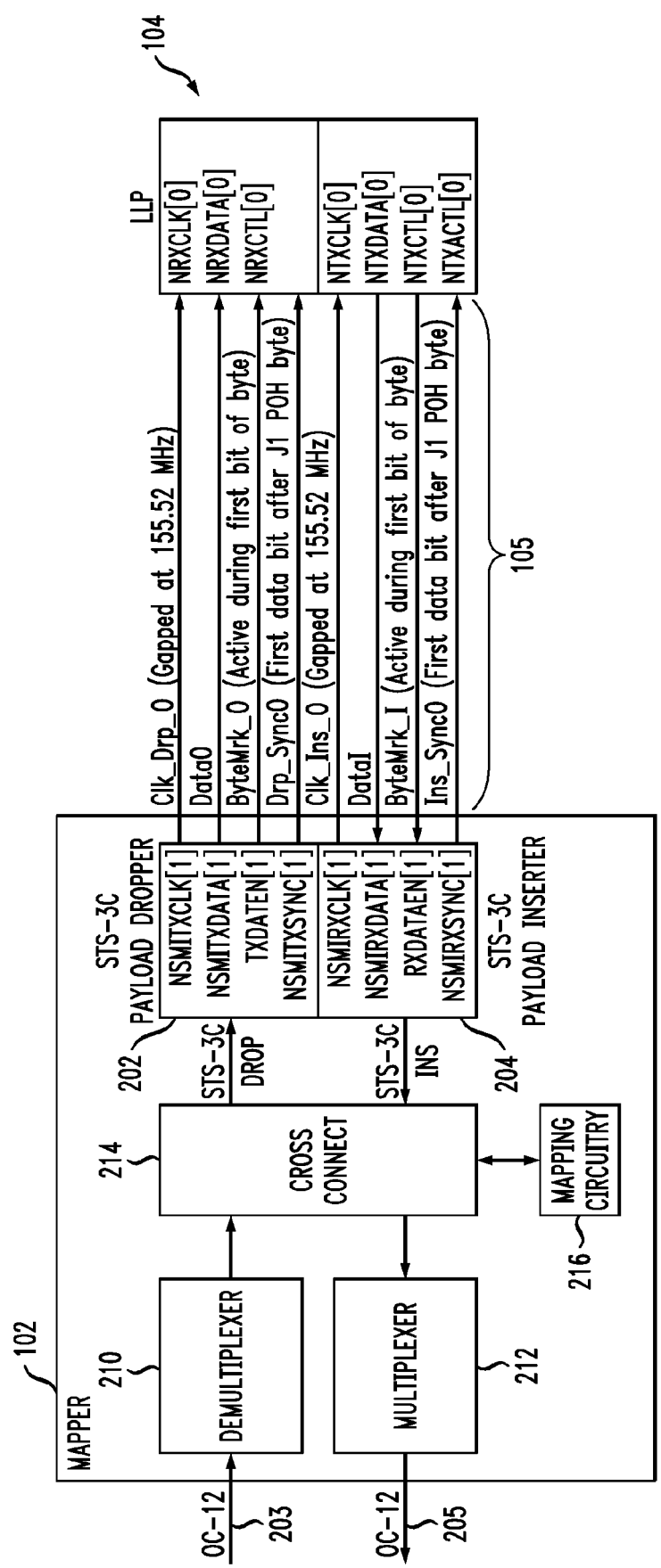
FIG. 2 is a more detailed view of a portion of the FIG. 1 system, showing exemplary implementations of mapper and link layer processor elements of the system.

FIG. 2 shows the mapper 102 and link layer processor 104 of system 100 in greater detail, as configured to implement STS-3c and STM-1 payload extraction and insertion functionality in an illustrative embodiment. The following description will be with reference to SONET STS-3c and OC-12 signals, but it should be understood that the techniques are also applicable to SDH signals such as STM-1 and STM-4, as well as to other types of synchronous transport signals.

The mapper 102 as shown includes an STS-3c payload dropper 202 configured to extract a payload from an STS-3c signal received over an OC-12 ingress link 203, and an STS-3c payload inserter 204 configured to insert a payload received from the link layer processor 104 into another STS-3c signal for transmission over an OC-12 egress link 205. The payload dropper 202 and payload inserter 204 are examples of elements that are more generally referred to herein as payload extraction circuitry and payload insertion circuitry, respectively. The payload extracted from the STS-3c signal received over ingress link 203 is transmitted by the mapper to the link layer processor over the interface 105, which in this embodiment comprises a serial interface for transmission and reception of such synchronous transport signal payloads, and more particularly a network multiplexed serial interface (NMSI).

A number of NSMI signal lines are shown in the figure, including NSMI signals lines in payload dropper 202 for transmit clock (TXCLK), transmit data (TXDATA), transmit data enable (TXDATEN), and transmit synchronization (TXSYNC), and in payload inserter 204 for receive clock (RXCLK), receive data (RXDATA), receive data enable (RXDATEN), and receive synchronization (RXSYNC). Corresponding NSMI signal lines in the link layer processor 104 as shown include lines denoted NRXCLK, NRXDATA, NRXCTL, NTXCLK, NTXDATA, NTXCTL and NTXACTL.

Conventional aspects of the NSMI are disclosed in, for example, NSMI Enhancements for V3 Mapper Devices, Agere Systems Application Note, Revision 1, Jan. 11, 2005, which is incorporated by reference herein. The present embodiment configures the mapper 102 and link layer processor 104 such that the NSMI may be used to communicate payload information between the mapper and link layer processor in an efficient manner, as will be described in greater detail below with reference to FIGS. 3 through 6.

The payload inserted into the STS-3c signal to be transmitted over the egress link 205 is received by the mapper 102 from the link layer processor 104 over the NSMI. It should be noted that interface 105 may comprise additional signal lines other than the particular NSMI lines shown the figure. Thus, the NSMI may be a portion of a larger signaling interface between the mapper and the link layer processor. The signal lines of a given signaling interface are also referred to herein as "pins." It should be noted that other embodiments may use different types of serial interfaces in place of the NSMI. Such serial interfaces may also be referred to herein as payload access interfaces.

The mapper 102 further includes a demultiplexer 210 having an input coupled to the ingress link 203, and a multiplexer 212 having an output coupled to the egress link 205. The demultiplexer 210 is configured to separate the particular incoming STS-3c signal from a corresponding higher-rate optical signal received over the ingress link. In this embodiment, as previously noted, the higher-rate optical signal is an OC-12 optical signal, which carries four STS-3c signals. The multiplexer 212 is configured to combine a given outgoing STS-3c signal into a corresponding higher-rate optical signal transmitted over the egress link 205. Again, this higher-rate optical signal is an OC-12 optical signal in the present embodiment, and it carries four STS-3c signals.

A cross-connect 214 of the mapper 102 is coupled between an output of the payload inserter 204 and an input of the multiplexer 212, and between an output of the demultiplexer 210 and an input of the payload dropper 202. The cross-connect is an example of what is more generally referred to herein as a switching element. The cross-connect in this embodiment controls delivery of the STS-3c signal from the demultiplexer to the payload dropper and delivery of the STS-3c signal from the payload inserter to the multiplexer 212. For example, in the case of the ingress and egress OC-12 optical signals shown in FIG. 2, the cross-connect can be configured to allow the payload of any of the four STS-3c signals carried by the ingress OC-12 signal to be extracted, and can allow a payload to be inserted into any of the four STS-3c signals carried by the egress OC-12 signal.

Mapping circuitry 216 is coupled to the cross-connect 214 as shown, and controls switching operations of the cross-connect. This mapping circuitry also may be configured, for example, to support conventional SPE mappings for STS-1 payloads such as DS3 or sub-STS-1 payloads such as VT mapped DS1, J1 or E1 signals, where VT denotes virtual tributaries. Such conventional mapping arrangements are well known and therefore not described in further detail herein.

The particular payloads to be extracted from or inserted into STS-3c signals in the present embodiment may be, for example, payloads comprising IP, ATM or FDDI signals, or signals configured in accordance with other protocols, in any combination. The present invention is thus not restricted in terms of the types of payloads that are carried by the synchronous transport signals processed by a mapper or other physical layer device.

The payload dropper 202 comprises a parallel-to-serial converter for converting the payload to serial format suitable for transmission to the link layer processor 104 over the NSMI. Similarly, the payload inserter 204 comprises a serial-to-parallel converter for converting the payload received from the link layer processor over the NSMI to a parallel format for further processing.

In the ingress direction, the mapper 102 receives the OC-12 signal from the ingress link 203. An STS-3c signal demultiplexed from the OC-12 signal by demultiplexer 210 is supplied via the cross-connect 214 to the payload dropper 202. After payload extraction and parallel-to-serial conversion, the serial payload bit stream is transmitted from the mapper to the link layer processor 104 via the NSMI.

In the egress direction, the payload inserter 204 receives an STS-3c payload from the link layer processor 104 via the NSMI. The payload inserter performs serial-to-parallel conversion, byte alignment and clock domain transformation operations, and then adds appropriate SONET overheads to form a complete STS-3c signal. The resulting STS-3c signal is sent to the multiplexer 212 via the cross-connect 214 and then transmitted as part of the OC-12 signal over the egress link 205.

The various signals of the NSMI are shown between the mapper 102 and link layer processor 104 in FIG. 2.

The payload drop or ingress portion of the NSMI in this embodiment comprises the following four pins:

1. Clk_Drp_O, Gapped Clock @ 155.52 MHz—Output (Data Valid Embedded within Gapped Clock).
2. DataO—Max rate=149.76 Mbits/s—Output
3. ByteMrk_O—Active high when most significant bit (MSB) is on pin DataO. That is, active during first bit of byte being transferred.
4. Drp_SyncO—Active high when first bit after J1 POH byte is output on DataO pin.

Figure 3:
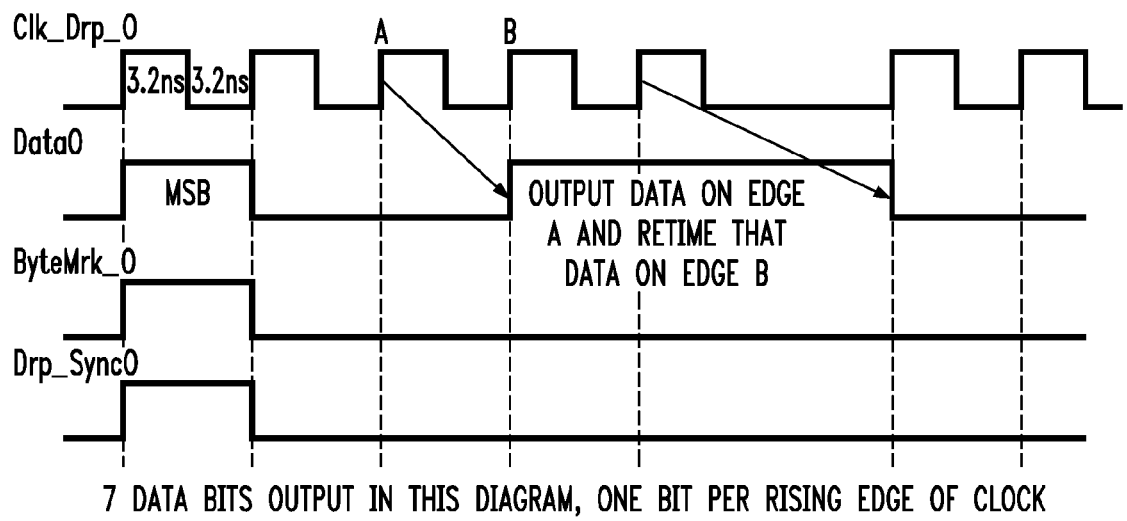
FIGS. 3 and 4 are timing diagrams illustrating the operation of respective payload extraction and payload insertion operations in the FIG. 1 system.

FIG. 3 shows a timing diagram for this payload drop or ingress portion of the NSMI. It can be seen from the timing diagram that the mapper 102 outputs payload data on the rising edge of the gapped clock Clk_Drp_O. The link layer processor 104 samples the data on the next rising edge of the gapped clock. Thus, as shown, data is output on edge A and retimed on edge B. Each byte is transferred from MSB to least significant bit (LSB). There are seven output data bits shown in the FIG. 3 diagram, one bit per rising edge of Clk_Drp_O.

The payload insertion or egress portion of the NSMI in this embodiment comprises the following four pins:

1. Clk_Ins_O, Gapped Clock @ 155.52 MHz—Output (Data Valid Embedded within Gapped Clock).
2. Ins_SyncO—Active high. After a fixed but programmable delay, the MSB of the first byte after the J1 POH byte is provided on the DataI pin.
3. DataI—Max rate=149.76 Mbits/s—Input
4. ByteMrk_I—Active high when MSB is on the DataI pin. That is, active during first bit of byte being transferred.

Figure 4:
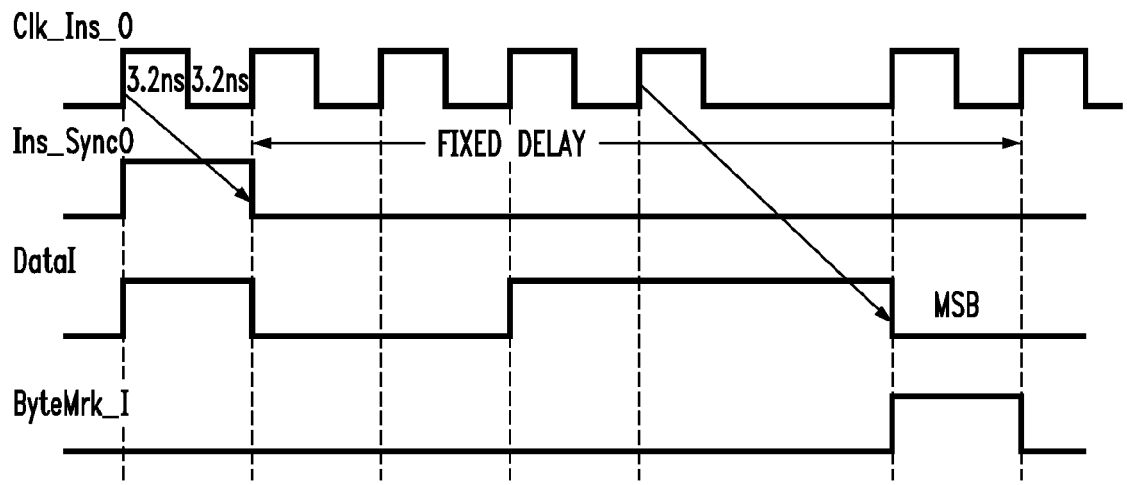

FIG. 4 shows a timing diagram for this payload insertion or egress portion of the NSMI. It can be seen from the timing diagram that the link layer processor 104 outputs payload data on the rising edge of the gapped clock Clk_Ins_O. The mapper 102 samples the data on the next rising edge of the gapped clock. Also, when Ins_SyncO is asserted, the MSB of the first byte after the J1 POH byte should be provided on the DataI pin after a fixed but programmable delay. There are seven input data bits shown in the FIG. 4 diagram, one bit per rising edge of Clk_Ins_O.

Figure 5:
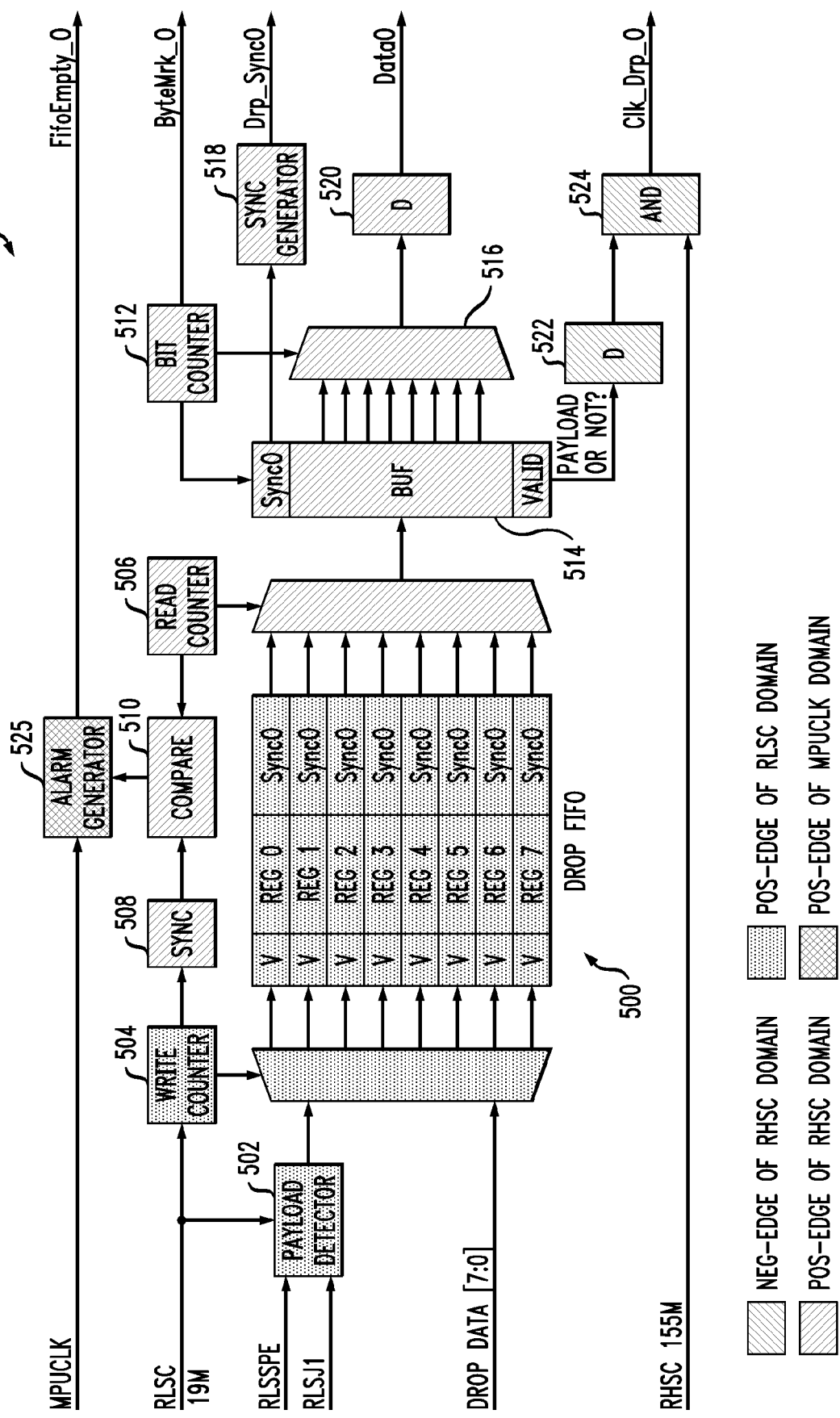
FIGS. 5 and 6 are block diagrams of respective payload extraction and payload insertion portions of the mapper of FIG. 2.

FIG. 5 shows a more detailed view of the payload dropper 202 of mapper 102. In this particular implementation, there are four distinct clock domains, as follows:

1. Positive edge (Pos-Edge) of Receive High Speed Clock (RHSC) domain. Its frequency is the same as the bit stream frequency of an STS-3c signal (155.52 MHz).
2. Negative-edge (Neg-Edge) of RHSC domain. It is used to generate the gapped clock Clk_Drp_O.
3. Pos-Edge of Receive Low Speed Clock (RLSC) domain. Its frequency is the same as the byte frequency of an STS-3c signal (19.44 MHz).
4. Pos-Edge of MPU clock MPUCLK. It is used to generate drop FIFO status events.

The payload dropper 202 comprises a Drop FIFO 500 which includes eight registers denoted Reg 0, Reg 1, . . . Reg 7. Also included is a payload detector 502, a write counter 504, a read counter 506, a synchronizer 508, a compare element 510, a bit counter 512, a buffer 514, a multiplexer 516, a sync generator 518, delay elements 520 and 522, an AND gate 524, and an alarm generator 525.

In operation, the payload detector 502 utilizes signals RLSJ1 and RLSSPE to detect an STS-3c payload based on respective J1 position and STS-3c SPE mark information.

Then each STS-3c byte and related information is written into the Drop FIFO 500. The Valid or "V" entries associated with the registers of the Drop FIFO indicate whether the current byte is payload or overhead, and the "SyncO" entries indicate whether the current byte is the first byte after J1. The Drop FIFO is written in the RLSC clock domain, but it is read in the RHCS clock domain in order to facilitate parallel-to-serial conversion.

The write pointer generated by write counter 504 starts at a different address than the read pointer generated by read counter 506. For example, the write pointer may start at address 0, while the read pointer starts at address 4, such that the distance between the pointers should be 4. Such an arrangement helps to ensure proper operation in the presence of dithering in the RHSC and RLSC clock domains. When the write pointer reaches address 0, it will be sampled in the RHSC domain by synchronizer 508, and compared in element 510 with the value of the read pointer. If the value of the read pointer is not within approximately 3 to 5 of the value of the write pointer, then an alarm will be generated in the MPU clock domain, by the alarm generator 525, and the read pointer will be reset to 4.

When an STS-3c byte and its related information are read out from the Drop FIFO 505, it is buffered in buffer 514 in the RHSC clock domain. Then a parallel-to-serial conversion is performed in element 516, and the resulting serial bit stream after delay D in element 520 is the output data signal DataO. If this byte is payload, then the gapped clock Clk_Drp_O is generated with the negative edge of the RHSC in AND gate 524. Otherwise, the gapped clock pin is held low. The pulse on the Drp_SyncO pin can be generated in sync generator 518, using the "SyncO" information read out from Drop FIFO 500 via buffer 514.

Figure 6:
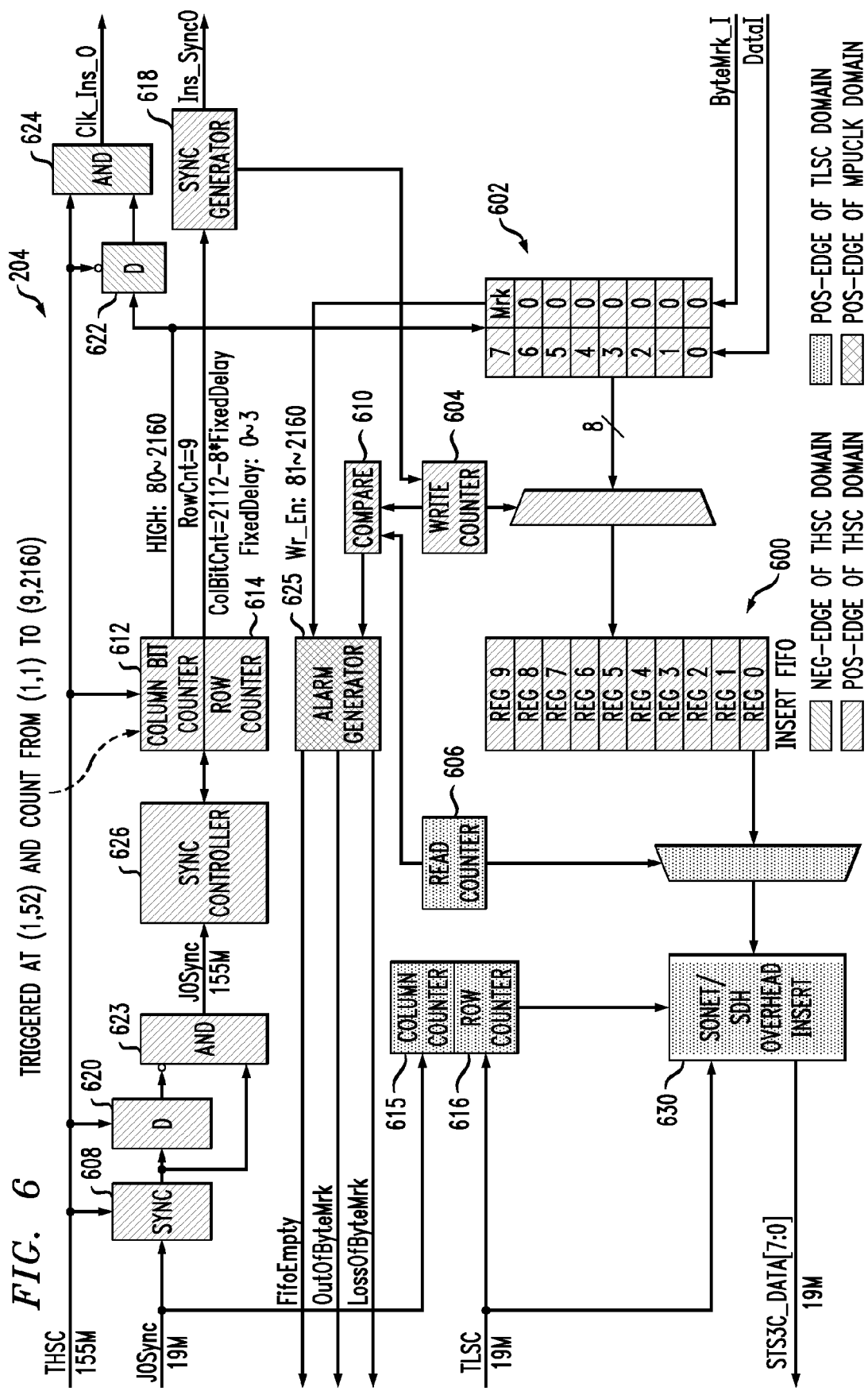

FIG. 6 shows a more detailed view of the payload inserter 204 of mapper 102. There are again four distinct clock domains, as follows:

1. Pos-Edge of Transmit High Speed Clock (THSC) domain. Its frequency is the same as the bit stream frequency of an STS-3c signal (155.52 MHz).

2. Neg-Edge of THSC domain. It is used to generate the gapped clock Clk_Ins_O.

3. Pos-Edge of Transmit Low Speed Clock (TLSC) domain. Its frequency is the same as the byte frequency of an STS-3C signal (19.44 MHz).

4. Pos-Edge of MPU clock. It is used to generate drop FIFO status events and indications of byte mark errors.

The payload inserter 204 comprises an Insert FIFO 600 which includes ten registers denoted Reg 0, Reg 1, ... Reg 9. Also included is a shift register bank 602, a write counter 604, a read counter 606, a synchronizer 608, a compare element 610, a column bit counter 612, a row counter 614, a column counter 615, a row counter 616, a sync generator 618, delay elements 620 and 622, AND gates 623 and 624, an alarm generator 625, a sync controller 626, and a SONET/SDH overhead inserter 630.

In operation, the payload inserter 204 utilizes transit phase information available in the mapper 102. This phase information is obtained from the J0 signal applied to synchronizer 608. As the STS-3c signal generated by payload inserter 204 will pass through the cross-connect 214, it is important that it conform to the transit phase of the mapper. The rising edge of the J0 mark in the TLSC domain is detected in the THSC clock domain via elements 608, 620, 623 and 626. The column bit counter 612 and row counter 614 count based on the detected J0 phase. The gapped clock Clk_Ins_O and Ins_SyncO signal are generated based on the counter values from counters 612 and 614 and the configured fixed delay.

The counter values ColBitCnt and RowCnt generated by the respective column bit counter 612 and row counter 614 in FIG. 6 are used to indicate the position of bits of an STS-3c frame. As indicated previously, an STS-3c signal has a 9*270 byte frame, which means the number of rows is 9 and the number of columns is 270 bytes (270*8=2160 bits). So the ColBitCnt (from 1 to 2160) and RowCnt (from 1 to 9) can indicate the position of each bit in the STS-3c frame. The ColBitCnt and RowCnt are trigged by the J0 signal, and start from RowCnt=1 and ColBitCnt=52. Then they increase circularly, e.g., (1,52)->(1,53)->(1,54)-> ... ->(1,2160)->(2,1)->(2,2)-> ... ->(9,2160)->(1,1)->(1,2)-> .... The ColBitCnt and RowCnt control the generation of output signals such as Clk_Ins_O and Ins_SyncO, and also control the arrangement of the input signals such as ByteMrk_I and DataI. For example, when ColBitCnt is from 80~2160, the Clk_Ins_O signal is effective. When RowCnt=9 and ColBitCnt=2112-8*FixedDelay (where FixedDelay can be programmable and is defined in bytes), the Ins_SyncO signal is active. When ColBitCnt is from 81~2160, the input signals ByteMrk_I and DataI will be captured and shifted in.

The shift registers of the register bank 602 are used to perform serial-to-parallel conversion and to perform a byte alignment operation based on the ByteMrk_I signal. As indicated previously, the ByteMrk_I signal represents the MSB of a byte. So the period of the byte mark pulse should be 8 THSC clock cycles. If it is not, an OutOfByteMrk alarm will be generated by the alarm generator 625 and reported to the MPU. If there is no byte mark pulse within 125 µs, then a LossOfByteMrk alarm will be generated by the alarm generator and reported to the MPU.

The Insert FIFO 600 is written in the THSC clock domain and read in the TLSC clock domain. The write pointer generated by write counter 604 starts at a different address than the read pointer generated by read counter 606. For example, the write pointer may start at address 5, while the read pointer starts at address 0, such that the distance between the pointers should be 5. Such an arrangement helps to ensure proper operation in the presence of dithering in the THSC and TLSC clock domains. When the read pointer reaches address 0, it will be sampled in the THSC domain and compared in element 610 with the value of the write pointer. If the value of the write pointer is not within approximately 4 to 6 of the value of the read pointer, then an alarm will be generated in the MPU clock domain, by the alarm generator 625, and the write pointer will be reset to 5.

After a payload byte is read from the Insert FIFO, SONET/SDH overheads such as TOH, LOH and POH can be inserted in element 630 based on the J0 phase of the mapper to form a complete STS-3c signal in the TLSC clock domain.

It is to be appreciated that the particular arrangements of payload extraction circuitry and payload insertion circuitry shown in FIGS. 5 and 6, respectively, are merely exemplary, and numerous alternative circuitry arrangements may be used to implement the payload extraction and insertion techniques disclosed herein.

The illustrative embodiments described above advantageously provide improved processing of synchronous transport signals in a network-based communication system. For example, configuring mapper 102 and link layer processor 104 in the manner described above allows payload extraction and insertion for STS-3c and STM-1 signals to be performed in the mapper, with just the payload information being communicated between the mapper and the link layer processor. This can significantly reduce the complexity and cost of the link layer processor, while also improving data throughput. Also, the disclosed arrangements allow the payload information to be transferred over a simple serial interface having a very low pin count. Furthermore, the use of a programmable delay between the insert sync pulse and the MSB of the first returned payload byte after J1 allows the interface to accommodate many different types of devices having a variety of different timing characteristics.

A link layer processor or other link layer device in accordance with the invention may be implemented as an integrated circuit device suitable for installation on a line card or port card of a router or switch. Numerous other configurations are possible.

In a given integrated circuit implementation, identical die are typically formed in a repeated pattern on a surface of a semiconductor wafer. Each die includes a mapper, link layer processor or other device as described herein, and may include other structures or circuits. The individual die are cut or diced from the wafer, then packaged as an integrated circuit. One skilled in the art would know how to dice wafers and package die to produce integrated circuits. Integrated circuits so manufactured are considered part of this invention.

Again, it should be emphasized that the embodiments of the invention as described herein are intended to be illustrative only. For example, the particular arrangement of physical layer device, link layer device, network processor and other elements as shown in FIG. 1 may be varied in alternative embodiments. Also, the particular signals shown in the drawings and described above are presented by way of example, and those skilled in the art will recognize that alternative signal configurations and associated timing arrangements may be used. As one illustration, the disclosed techniques may be applied to synchronous transport signals other than STS-3c or STM-1 signals. Furthermore, other types of circuitry may be used to implement payload extraction and insertion operations as disclosed herein. These and numerous other alternative embodiments within the scope of the following claims will be readily apparent to those skilled in the art.

What is claimed is:

1. A physical layer device for communication with a link layer device in a network-based communication system, the physical layer device comprising:
    payload extraction circuitry which extracts a payload from an ingress synchronous transport signal received over an ingress link; and
    payload insertion circuitry which inserts a payload received from the link layer device into an egress synchronous transport signal for transmission over an egress link;
    wherein the payload extracted from the ingress synchronous transport signal is converted from parallel to serial form in the payload extraction circuitry and transmitted by the physical layer device to the link layer device in serial form in over an output serial data line of a serial interface; and
    wherein the payload inserted into the egress synchronous transport signal is received by the physical layer device from the link layer device in serial form over an input serial data line of the serial interface and converted from serial to parallel form in the payload insertion circuitry.

2. The physical layer device of claim 1 wherein the physical layer device comprises a mapper.

3. The physical layer device of claim 1 further comprising:
    a demultiplexer having an input coupled to the ingress link, the demultiplexer being configured to separate the ingress synchronous transport signal from a corresponding higher-rate optical signal received over the ingress link;
    a multiplexer having an output coupled to the egress link, the multiplexer being configured to combine the egress synchronous transport signal into a corresponding higher-rate optical signal transmitted over the egress link; and
    a switching element coupled between an output of the payload insertion circuitry and an input of the multiplexer and between an output of the demultiplexer and an input of the payload extraction circuitry;
    the switching element controlling delivery of the ingress synchronous transport signal from the demultiplexer to the payload extraction circuitry and delivery of the egress synchronous transport signal from the payload insertion circuitry to the multiplexer.

4. The physical layer device of claim 3 further comprising mapping circuitry coupled to the switching element and configured to control switching operations of the switching element.

5. The physical layer device of claim 1 wherein the ingress and egress synchronous transport signals each comprise an STS-3c signal or an STM-1 signal.

6. The physical layer device of claim 3 wherein the higher-rate optical signals each comprise an OC-12 signal or an STM-4 signal.

7. The physical layer device of claim 1 wherein the serial interface over which the payload extracted from the ingress synchronous transport signal is transmitted by the physical layer device to the link layer device and over which the payload inserted in the egress synchronous transport signal is received by the physical layer device from the link layer device comprises a network serial multiplexed interface.

8. The physical layer device of claim 1 wherein the serial interface further comprises input and output gapped clock signal lines.

9. The physical layer device of claim 8 wherein the serial interface comprises input and output byte mark signal lines.

10. The physical layer device of claim 9 wherein the serial interface comprises separate output extraction and insertion synchronization signal lines for carrying respective extraction and insertion synchronization signals for use by the link layer device in processing information associated with the respective extracted and inserted payloads.

11. The physical layer device of claim 10 wherein said physical layer device is configured to provide a programmable delay between a given pulse of the insertion synchronization signal and a designated bit of the inserted payload.

12. The physical layer device of claim 11 wherein the designated bit comprises a most significant bit of a given byte of the inserted payload.

13. An integrated circuit comprising the physical layer device of claim 1.

14. A link layer device for communication with a physical layer device in a network-based communication system, the link layer device comprising:
    interface circuitry which provides a link layer device portion of a serial interface between the link layer device and the physical layer device;
    the interface circuitry receiving over a first serial data line of the serial interface a payload extracted by the physical layer device from an ingress synchronous transport signal received by the physical layer device over an ingress link; and
    the interface circuitry transmitting over a second serial data line of the serial interface a payload to be inserted by the physical layer device into an egress synchronous transport signal for transmission by the physical layer device over an egress link;

wherein the payload extracted from the ingress synchronous transport signal is converted from parallel to serial form in payload extraction circuitry of the physical layer device; and wherein the payload inserted into the egress synchronous transport signal is converted from serial to parallel form in payload insertion circuitry of the physical layer device.

15. The link layer device of claim 14 wherein said device comprises at least one of a link layer processor and a field programmable gate array.

16. An integrated circuit comprising the link layer device of claim 14.

17. A node of a network-based communication system, said node comprising:

a physical layer device; and
a link layer device coupled to the physical layer device;
wherein the physical layer device comprises:
payload extraction circuitry which extracts a payload from an ingress synchronous transport signal received over an ingress link; and
payload insertion circuitry which inserts a payload received from the link layer device into an egress synchronous transport signal for transmission over an egress link;
wherein the payload extracted from the ingress synchronous transport signal is converted from parallel to serial form in the payload extraction circuitry and transmitted by the physical layer device to the link layer device in serial form over an output serial data line of a serial interface; and
wherein the payload inserted into the egress synchronous transport signal is received by the physical layer device from the link layer device in serial form over an input serial data line of the serial interface and converted from serial to parallel form circuitry.

18. The node of claim 17 wherein said physical layer and link layer devices comprise respective integrated circuits.

19. A network-based communication system, said system comprising:

a plurality of interconnected nodes;
wherein at least a given one of said nodes comprises:
a physical layer device; and
a link layer device coupled to the physical layer device;
wherein the physical layer device comprises:
payload extraction circuitry which extracts a payload from an ingress synchronous transport signal received over an ingress link; and
payload insertion circuitry which inserts a payload received from the link layer device into an egress synchronous transport signal for transmission over an egress link;
wherein the payload extracted from the ingress synchronous transport signal is converted from parallel to serial form in the payload extraction circuitry and transmitted by the physical layer device to the link layer device in serial form over an output serial data line of a serial interface; and
wherein the payload inserted into the egress synchronous transport signal is received by the physical layer device from the link layer device in serial form over an input serial data line of the serial interface and converted from serial to parallel foim in the payload insertion circuitry.

20. The system of claim 19 wherein the serial interface further comprises input and output gapped clock signal lines, input and output byte mark signal lines, and separate output extraction and insertion synchronization signal lines for carrying respective extraction and insertion synchronization signals for use by the link layer device in processing information associated with the respective extracted and inserted payloads.

* * * * *

UNITED STATES PATENT AND TRADEMARK OFFICE
CERTIFICATE OF CORRECTION

PATENT NO. : 7,742,493 B2  Page 1 of 1
APPLICATION NO. : 11/839971
DATED : June 22, 2010
INVENTOR(S) : Cheng G. Duan It is certified that error appears in the above-identified patent and that said Letters Patent is hereby corrected as shown below:

Claim 1, col. 11, line 53, before "circuitry" please delete "in".

Claim 17, col. 13, line 37, please insert --in the payload insertion--.

Claim 19, col. 14, line 27, please delete "foim" and insert --form--.

Signed and Sealed this

Seventeenth Day of August, 2010

David J. Kappos
*Director of the United States Patent and Trademark Office*